United States Patent [19]

Depault

[11] Patent Number: 5,772,082
[45] Date of Patent: Jun. 30, 1998

[54] METHOD AND APPARATUS FOR SPREADING A LIQUID SLURRY

[76] Inventor: Marcel Depault, 1337 rue Principale, St-Valérien, Co. Shefford, Quebec, Canada, J0H 2B0

[21] Appl. No.: 785,598

[22] Filed: Jan. 17, 1997

Related U.S. Application Data

[62] Division of Ser. No. 328,422, Oct. 25, 1994, Pat. No. 5,595,397, which is a division of Ser. No. 903,455, Jun. 24, 1992, Pat. No. 5,357,883, which is a continuation-in-part of Ser. No. 857,426, Mar. 24, 1992, abandoned.

[51] Int. Cl.[6] ............................................. B67D 5/40
[52] U.S. Cl. ..................... 222/383.2; 222/627; 239/662
[58] Field of Search ................................... 222/613, 623, 222/626, 627, 383.2, 385, 410; 239/662

[56] References Cited

U.S. PATENT DOCUMENTS

| | | | |
|---|---|---|---|
| 1,659,262 | 2/1928 | Guthrie | 172/713 X |
| 2,152,511 | 3/1939 | Vanderwerf | 280/443 |
| 2,228,207 | 1/1941 | Forssell | 222/383.2 X |
| 2,275,302 | 3/1942 | Magnuson | 280/839 |
| 2,394,154 | 2/1946 | Curtis et al. | 222/383 |
| 2,398,248 | 6/1946 | Reid | 280/677 X |
| 2,446,205 | 8/1948 | Wickersham et al. | 280/677 X |
| 2,650,003 | 8/1953 | Coleman | 222/318 |
| 2,771,040 | 11/1956 | Folmsbee | 280/839 X |
| 3,017,057 | 1/1962 | Reed | 222/318 |
| 3,190,507 | 6/1965 | MacMillin | 222/383.2 |
| 3,317,088 | 5/1967 | Funk et al. | 222/627 |
| 3,369,823 | 2/1968 | Tomen | 280/677 X |
| 3,420,452 | 1/1969 | Vaughan | 222/627 X |
| 3,489,320 | 1/1970 | MacKinnon | 222/627 X |
| 4,014,271 | 3/1977 | Rohlf et al. | 239/662 X |
| 4,211,175 | 7/1980 | Van Der Lely | 111/127 |
| 4,221,398 | 9/1980 | Pautrat | 280/444 |
| 4,594,006 | 6/1986 | Depault | 366/266 |
| 4,807,544 | 2/1989 | Cross et al. | 111/127 |
| 5,364,116 | 11/1994 | Houle et al. | 280/444 X |
| 5,435,493 | 7/1995 | Houle | 239/662 |

FOREIGN PATENT DOCUMENTS

| | | |
|---|---|---|
| 794572 | 2/1936 | France . |
| 1 212 775 | 3/1966 | Germany . |
| 6403907 | 10/1964 | Netherlands . |
| 158356 | 11/1978 | Netherlands . |
| 238944 | 3/1969 | U.S.S.R. . |
| 735583 | 6/1952 | United Kingdom . |
| 1007304 | 10/1965 | United Kingdom . |

*Primary Examiner*—Kevin P. Shaver
*Attorney, Agent, or Firm*—Foley & Lardner

[57] ABSTRACT

A trailer vehicle for distributing a fertilizing manure slurry to a field which includes a slurry distribution assembly mounted to the tear of the vehicle having four slurry distribution units, each with three plow teeth and a slurry distribution nozzle associated with the teeth for feeding the slurry at root level in the soil. The distribution assembly includes an elongated manifold with four flexible conduits extending from the manifold to each nozzle on the distribution units. The manifold communicates with the slurry tank. The trailer vehicle can also have a special suspension to maintain the tank relatively level. The trailer has three sets of wheels which are articulated in tandem, and the rear wheels of the trailer can be steered in the arc traced by the motive vehicle pulling the trailer. The tank includes an annular wall defining an impeller pump area and a door is hinged to the annular wall. An impeller pump wheel is mounted on the door in the pump area which pumps slurry to the distribution assembly.

2 Claims, 17 Drawing Sheets

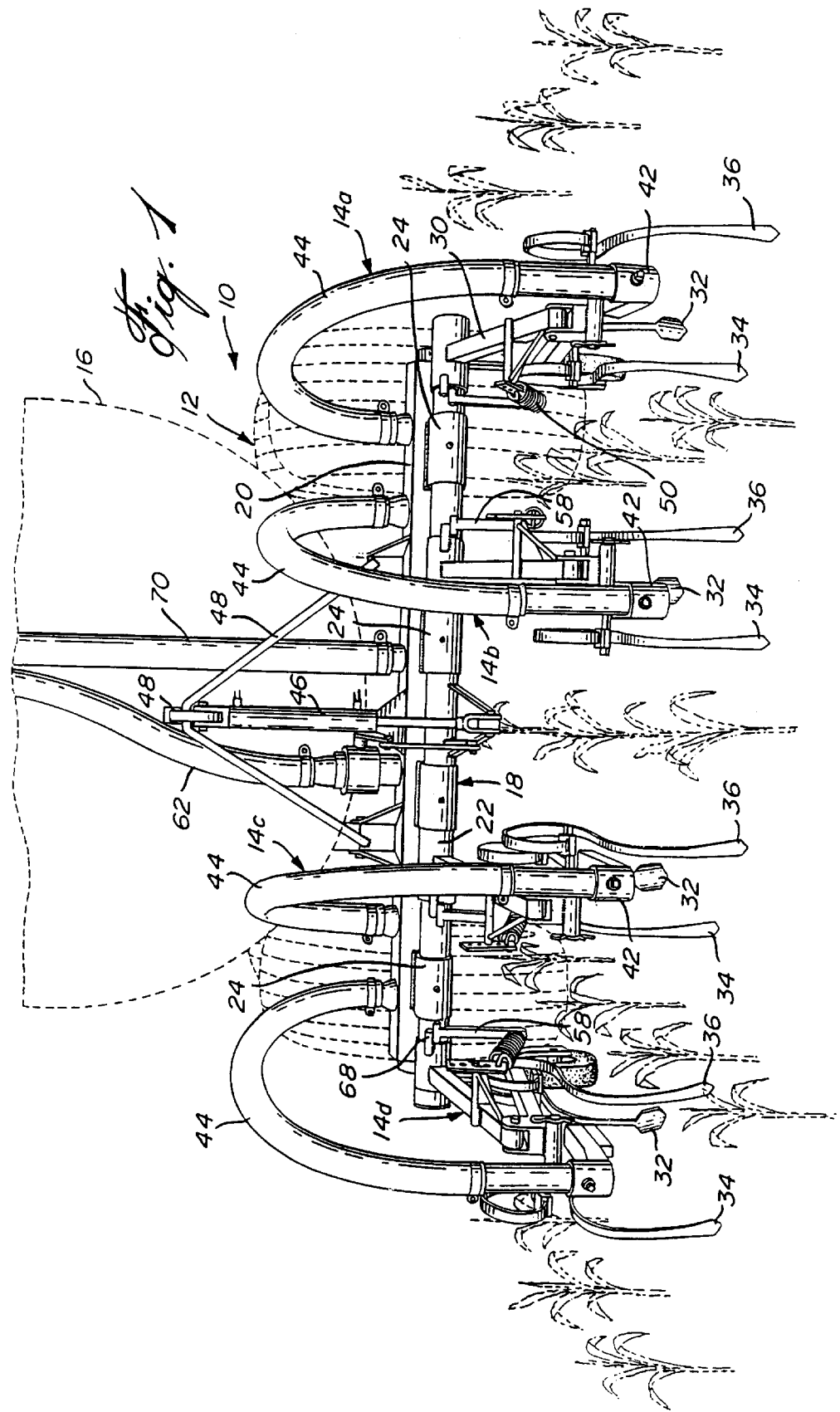

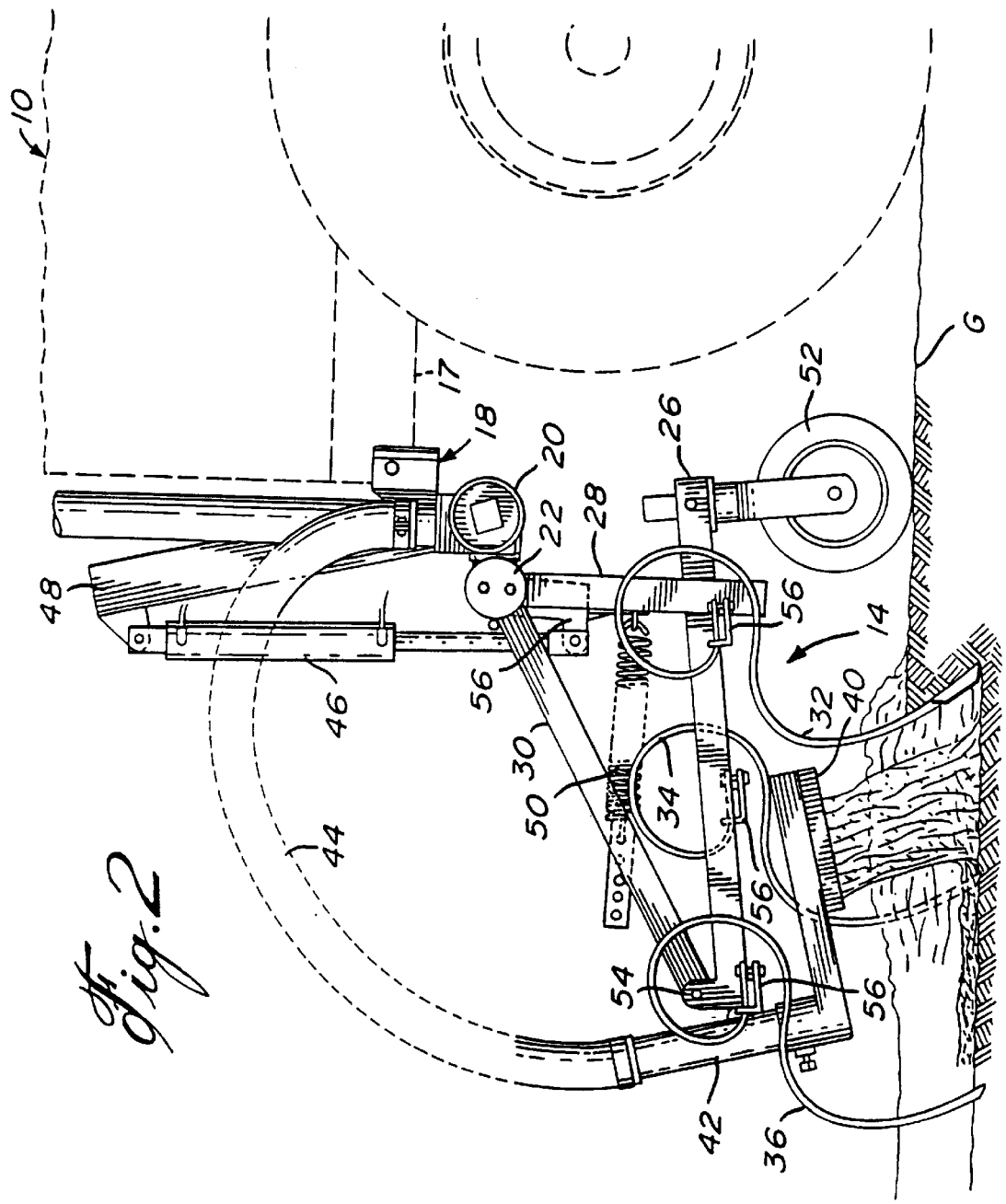

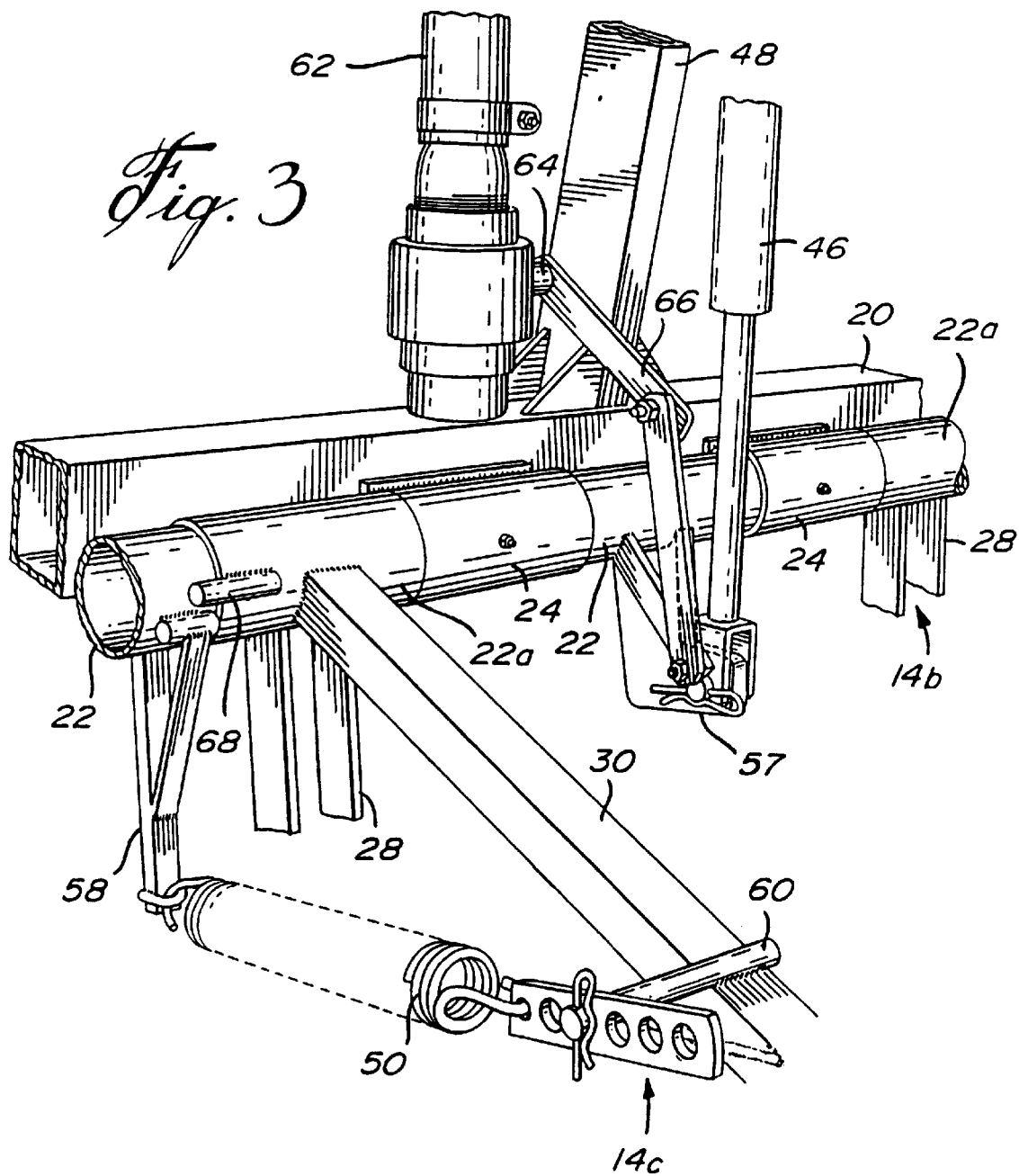

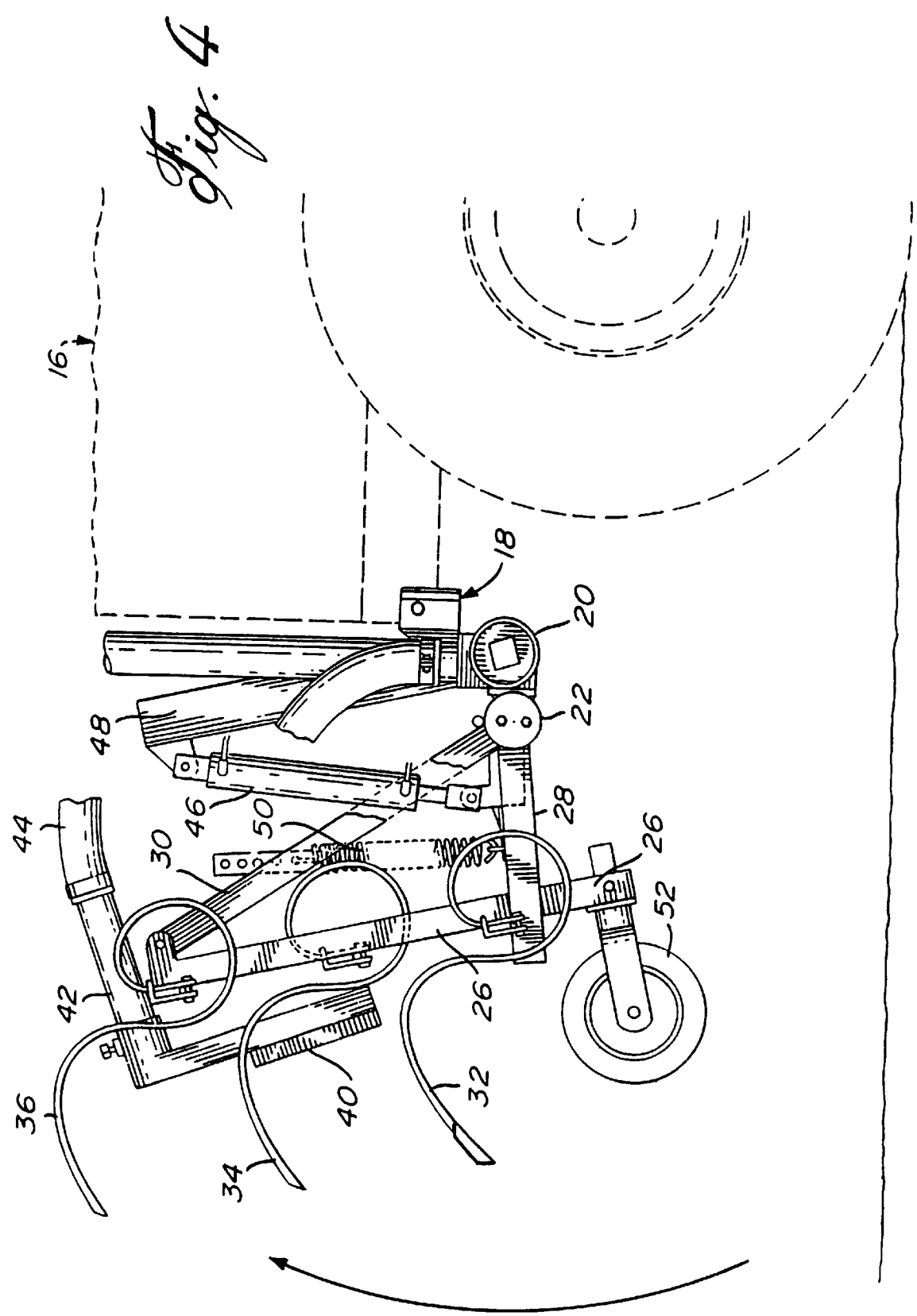

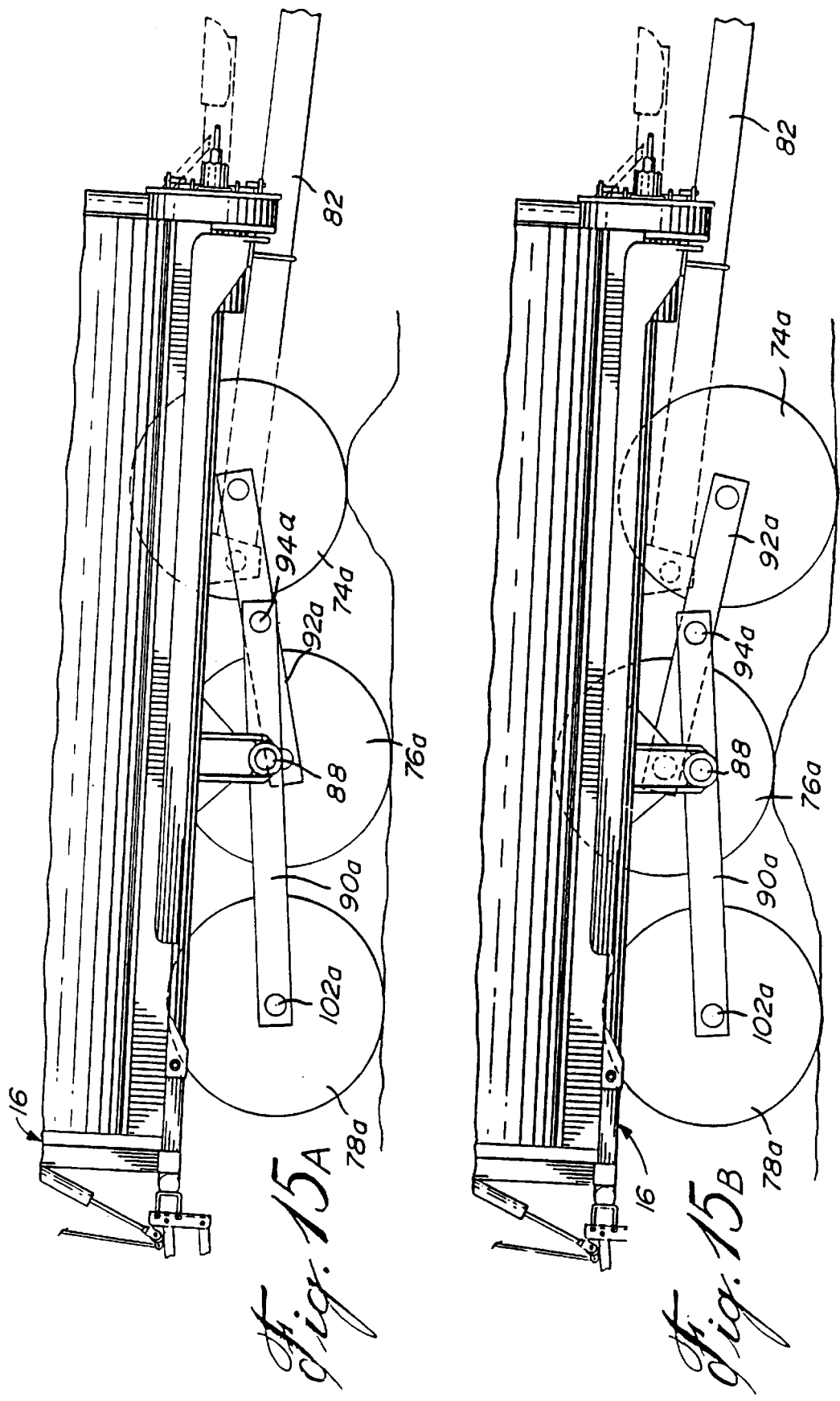

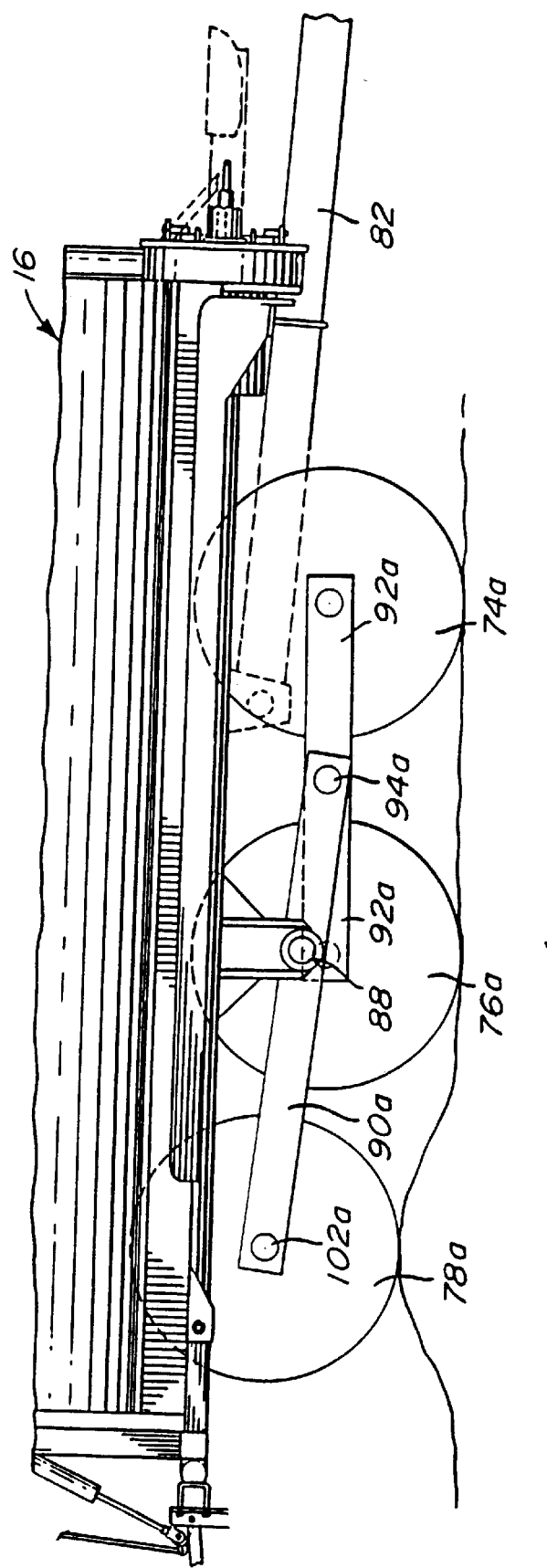

5,772,082

METHOD AND APPARATUS FOR SPREADING A LIQUID SLURRY

CROSS-REFERENCE TO RELATED APPLICATION

This is a divisional of application Ser. No. 08/328,422 filed Oct. 25, 1994, now U.S. Pat. No. 5,595,397, which is a divisional of Ser. No. 07/903,455 filed Jun. 24, 1992, now U.S. Pat. No. 5,357,883, which is a continuation-in-part of Ser. No. 07/857,426 filed Mar. 24, 1992, now abandoned.

BACKGROUND OF THE INVENTION

1. Field of the Invention

The present invention relates to a method and apparatus for spreading a liquid slurry, and more particularly, to spreading fertilizer in a field.

2. Description of the Prior Art

It is quite common for farmers to collect animal manure in a lagoon next to a barn in which animals are kept, and to recycle the manure as fertilizer for vegetable growing fields, such as in corn fields or the like. Presently, the manure is pumped from the lagoon as a slurry (using a pumping device as described in U.S. Pat. No. 4,594,006, issued Jun. 10, 1986, and U.S. patent application Ser. No. 434,909, filed Nov. 9, 1989 in the name of the applicant), into a tank mounted on a vehicle, and the vehicle, either self-propelled or a trailer drawn by a farm tractor, is passed through a corn field spreading the slurry on the soil surface. In some cases, particularly if the stalks of corn have sprouted above the ground surface, in rows, coinciding with the planting furrows, care is taken to ensure that the vehicle wheels pass in paths between the furrows, and the delivery of the manure slurry is directed by nozzles onto the paths between the furrows.

In these cases, the manure is spread on the surface and thus the fertilization is dependent on the amount of slurry which seeps or leaches into the earth, assuming it does not get washed away by rain water or drained because of the slope of the land.

SUMMARY OF THE INVENTION

It is an aim of the present invention to provide an improved apparatus for spreading a slurry of fertilizer in a growing field.

It is a further aim of the present invention to introduce the slurry of fertilizer mechanically below the soil surface, preferably at root level.

It is a further aim of the present invention to provide an improved suspension system for a vehicle.

It is a still further aim of the present invention to provide an improved method of growing corn and like vegetables.

An apparatus in accordance with the present invention comprises a vehicle having a chassis with a front end and a rear end, a slurry holding tank on the chassis between the front end and rear end, a slurry distributing assembly mounted on the chassis at the rear end thereof, and means for moving the assembly between a storage position wherein the slurry distributing assembly is inoperative and an application position wherein the slurry distributing assembly is operative. The slurry distributing assembly includes a frame mounted to the chassis and at least a slurry distributing unit having a plow beam mounted on the frame and having an axis parallel to the longitudinal axis of the vehicle; a plurality of plow means mounted on the beam and one of the plow means is a colter tooth with the other plow means spaced apart rearwardly thereof on the beam; a slurry nozzle mounted to the beam and interspaced with the plow means, behind the colter tooth, with the nozzle facing downwardly towards the soil when the frame is in the application position; conduit means communicating the holding tank and the nozzle means, and pump means delivering the slurry to the nozzle from the tank whereby the soil may be furrowed by at least the colter tooth when the assembly is in an application position and slurry can be delivered into the so-formed furrow.

In a more specific embodiment, the frame includes a sub-frame rotatable about a hinge axis extending laterally of the rear end of the chassis, and an actuation means for rotating the sub-frame about the hinge axis between the application position and the storage position. The slurry distributing assembly is mounted on the sub-frame.

More specifically, the hinge axis is included in a shaft, and the sub-frame further includes a bracket extending radially from the shaft and downwardly when in the application position, and an arm extends radially, rearwardly of the shaft, at an acute angle and within the same plane as the bracket. The beam is pivotally connected to the free end of the arm remote from the shaft, and the beam is associated with the bracket for limited pivoting movement relative to the arm. A wheel is provided at the front end of the beam adapted to contact the soil to support the beam when the slurry distributing assembly is in the application position.

In another embodiment, the sub-frame may include a first bracket mounted for rotation on the shaft and a second bracket mounted on the plow beam and a parallelogram linkage between the first and second brackets such that the plow beam and the second bracket can move vertically relative to the first bracket.

In a more specific embodiment, there are several sub-frames mounting independent slurry distribution units mounted on the shaft in laterally, spaced-apart relation with the spacing approximating the distance between paths.

In a method in accordance with the present invention, there are provided the steps of seeding a field with vegetable seeds and placing the seeds in longitudinal, spaced-apart rows forming paths therebetween, allowing the seeds to sprout their stalks through the top surface of the soil, forming temporary furrows in the paths and immediately injecting a fertilizing slurry in the temporary furrows at root level and closing the furrows. More specifically, the fertilizer is a manure slurry.

In another aspect of the present invention, there is provided a suspension system for a vehicle wherein the vehicle is a trailer and mounts a manure slurry tank on a chassis, the chassis including a hitch pole at the front end thereof and a manure slurry distribution assembly at the rear end of the chassis, at least three sets of wheels in tandem mounted to the chassis by having a first axle extending laterally of the chassis and a first beam pivotally mounted about the axis of the axle on either side of the chassis, each first beam mounting wheel means at the rear free end thereof and mounting a second wheel mounting beam at the front free end thereof, each second beam mounting a wheel at each front and rear ends thereof.

In another aspect of the present invention, there is provided a trailer including a chassis mounting a slurry tank thereon, the chassis including a hitch pole extending longitudinally at the front thereof and an articulated hitch pole extension at the front end of the hitch pole and adapted to be connected to a motive vehicle, at least three sets of wheels mounted to the chassis with the rear set of wheels being articulated about respective vertical axes, an action-reaction communication means between the hitch pole and the hitch pole extension communicating with actuation means on the chassis for providing opposite articulation of the rear set of wheels such that the trailer will follow an arc traced by the motive vehicle to which the hitch pole extension is connected.

BRIEF DESCRIPTION OF THE DRAWINGS

Having thus generally described the nature of the invention, reference will now be made to the accompanying drawings, showing by way of illustration, a preferred embodiment thereof, and in which:

FIG. 1 is a perspective view taken from the end of the apparatus in accordance with the present invention;

FIG. 2 is a side elevation of the apparatus shown in FIG. 1;

FIG. 3 is a fragmentary enlarged perspective view of a detail shown in FIG. 1;

FIG. 4 is a side elevation of the apparatus shown in FIG. 2 but in a different operative position;

FIG. 10, which is on the same sheet as FIG. 8, is a fragmentary end elevation of a further detail shown partly in cross-section;

FIGS. 15a through 15c are fragmentary vertical longitudinal cross-sections taken through the trailer vehicle illustrating the suspension in different operating positions;

DESCRIPTION OF THE PREFERRED EMBODIMENTS

Figure 3A:
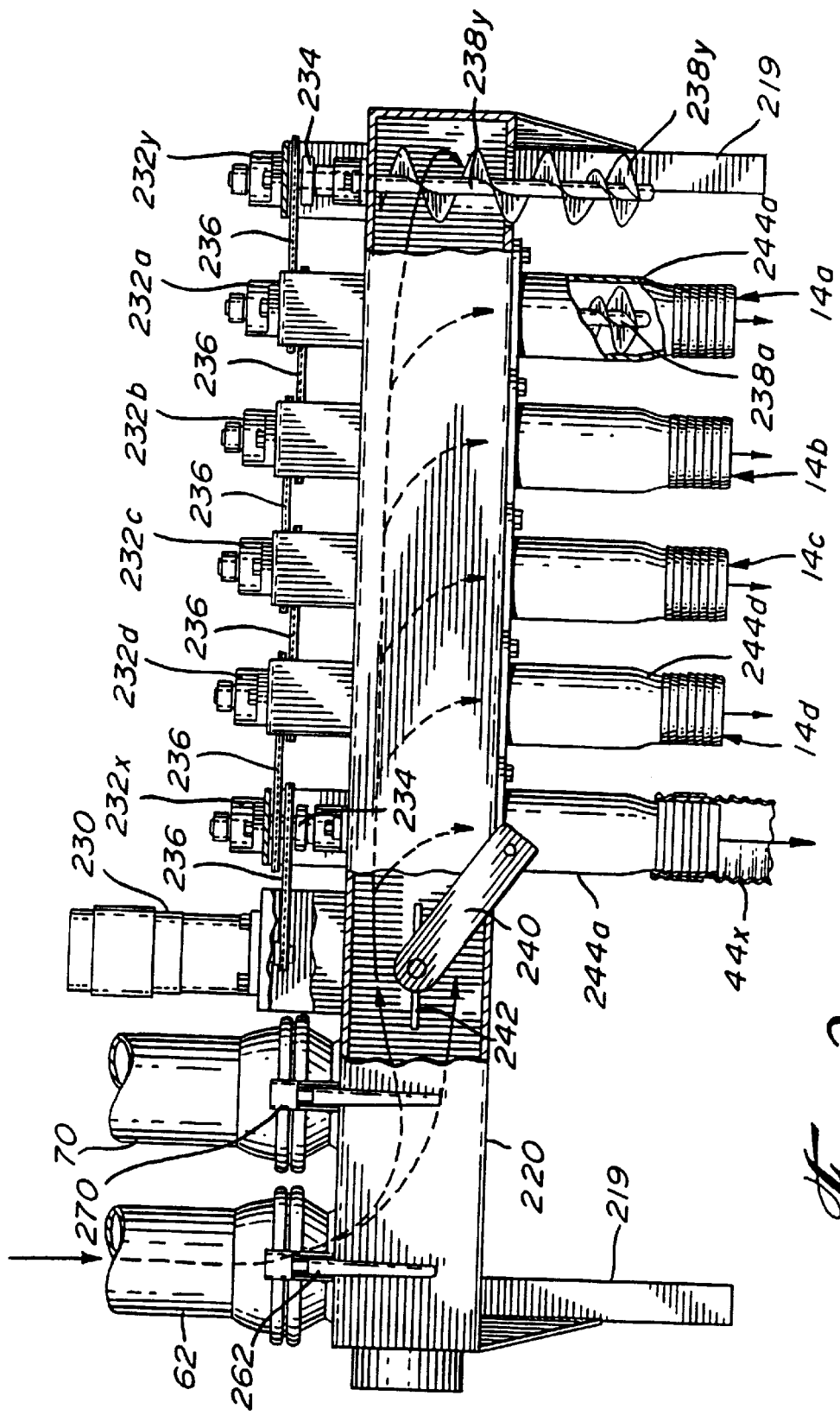
FIG. 3a is an enlarged end elevation, partly in cross-section, of another embodiment of the detail of the manifold shown in FIGS. 1 and 3.

Referring now to the drawings, and in particular FIGS. 1, 2, and 3, there is shown a trailer vehicle 10 for spreading a manure slurry which includes a manure distribution assembly 14 mounted to a chassis 12 of vehicle 10. The vehicle 10 is provided with a tank 16 on the chassis 12. A frame 18, of the slurry distribution assembly 14, is mounted to the chassis 12 and extends laterally thereof.

FIGS. 1 to 3 show in detail the construction of the manure distribution assembly 14 which will now be described. A distribution manifold 20 is mounted to the elongated frame 18 for receiving the manure slurry from tank 16. This embodiment includes four distribution units 14a, 14b, 14c, and 14d, all spaced apart laterally on the frame 18. A shaft 22 is journaled in sleeves 24 mounted to the manifold 20 and frame 18. The shaft 22 can be rotated by means of a piston and cylinder arrangement 46 which will be described later. Each unit 14a, 14b, 14c, and 14d includes a plow beam 26 hingedly connected at its downstream end to the free end of an arm 30 which in turn is fixed to a sleeve 22a journaled freely on the shaft 22. A bracket 28, including two parallel plates, extends downwardly from the shaft 22a and supports the other end of the plow beam 26. The bottom of the bracket 28 is closed, and the beam 26 is adapted to travel vertically within the slot formed by bracket 28.

In the present embodiment, there are three plow teeth including a colter 32 and teeth 34 and 36 mounted to the plow beam 26. The colter 32 and plow teeth 34, 36 are clamped at their upper end to the plow beam 26 by brackets 56, and each tooth has an S shape which allows a spring action. These plow teeth are arranged on alternate sides of the plow beam 26a. The colter 32 breaks the surface of the ground to allow the manure to be distributed and fed directly to root level by means of a furrow created by the colter 32. The downstream teeth 34 and 36 are offset and will tend to cover the furrow opened by colter 32.

An idler wheel 52 is mounted at the front end of plow beam 26 in order to guide the plow beam 26 over the terrain somewhat independently of the vehicle so that the plow teeth follow the contours of the terrain as discerned by the wheel 52.

The plow beam 26 is urged downwardly in the bracket 28 rotating clockwise about the pivot 54, by gravity.

The arm 30 and the bracket 28 are urged downwardly by means of a spring 50 which is attached to an intermediate point of the arm 30 at 60 and is anchored to a bracket 58 fixedly mounted to shaft 22.

A stopper pin 68 is mounted on the sleeve 22a, and thus the sleeve is limited in its downward movement by abutting against a portion of bracket 58. The spring 50 urges arm 30 on sleeve 22a to rotate counterclockwise (as shown in FIG. 2).

Figure 7:
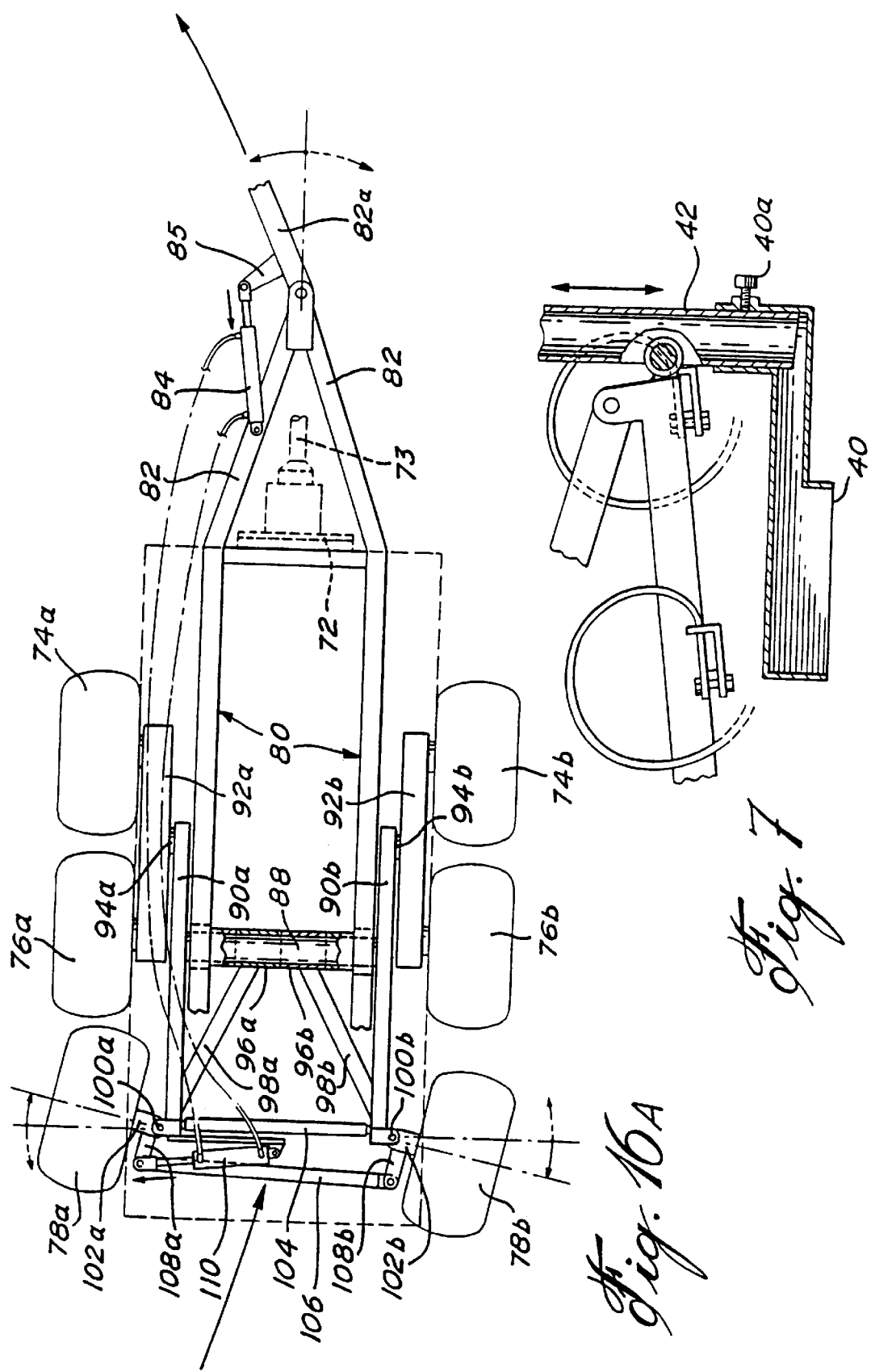
FIG. 7 is an enlarged fragmentary cross-section of a detail of the apparatus.

A tubular foot 42 with a shoe-shaped nozzle 40 is provided at the end of the beam 26. The foot 42 communicates with manifold 20 by way of a flexible tube 44. As can be seen in FIG. 7, the shoe-shaped nozzle 40 can be adjusted against the foot 42 by means of an adjustment screw 40a. The flow from the foot 42 can be increased or reduced by adjusting the opening at the end of the foot 42 within the shoe-shaped nozzle 40. The nozzle 40 defines an elongated narrow slot. The nozzle 40 is located underneath the beam 26 and between the plow teeth 34 and 36 directly behind colter 32. Thus, as the colter 32 creates a small furrow in the soil, the manure slurry can be deposited directly into the small furrow which will then be closed by teeth 34 and 36. For instance, the colter 32 will create a first furrow in which the slurry can be fed into the so-formed furrow while the following teeth 34 and 36 will tend to dig small furrows adjacent the center furrow causing the soil to close back onto the central furrow in which the manure slurry is being captured.

A sub-frame 48 is mounted to frame 18 in order to suspend the piston and cylinder arrangement 46 shown in FIGS. 1, 2, and 3. The end of the piston is attached by means of a link 57 to the shaft 22.

Referring now to FIG. 4, the distribution assembly can be pivoted from an application position shown in FIGS. 1, 2, and 3 to a storage position as shown in FIG. 4 by activating the hydraulic cylinder 46 to retract the piston and thus rotate the shaft 22 clockwise. When the shaft 22 is rotated about its axis by means of the cylinder and piston arrangement 46, the bracket 58 will engage the pin 68 on sleeve 22a, causing the sleeve 22a, arm 30, thus entraining beam 26 of each distribution unit 14a, 14b, 14c, and 14d, to rotate clockwise as shown in FIG. 4. When it is required to place the apparatus in an application position, the cylinder and piston 46 is deployed to then rotate the shaft 22 and its depending arms 30 counterclockwise.

As shown in FIG. 1, there may be four or more distribution units 14a, 14b, 14c, and 14d, and they are especially spaced apart to coincide with the paths between the rows of vegetables as shown in dotted lines in FIG. 1. Thus, the manure can be spread after plants such as corn have grown to a certain height. It has been found by furnishing fertilizer, such as manure, when the plants have sprouted and the stalks, in the case of corn, are about 45 cm., and to place the manure slurry at about root level, that the growth subsequent to the application of the fertilizer is quite significant.

Figure 5:
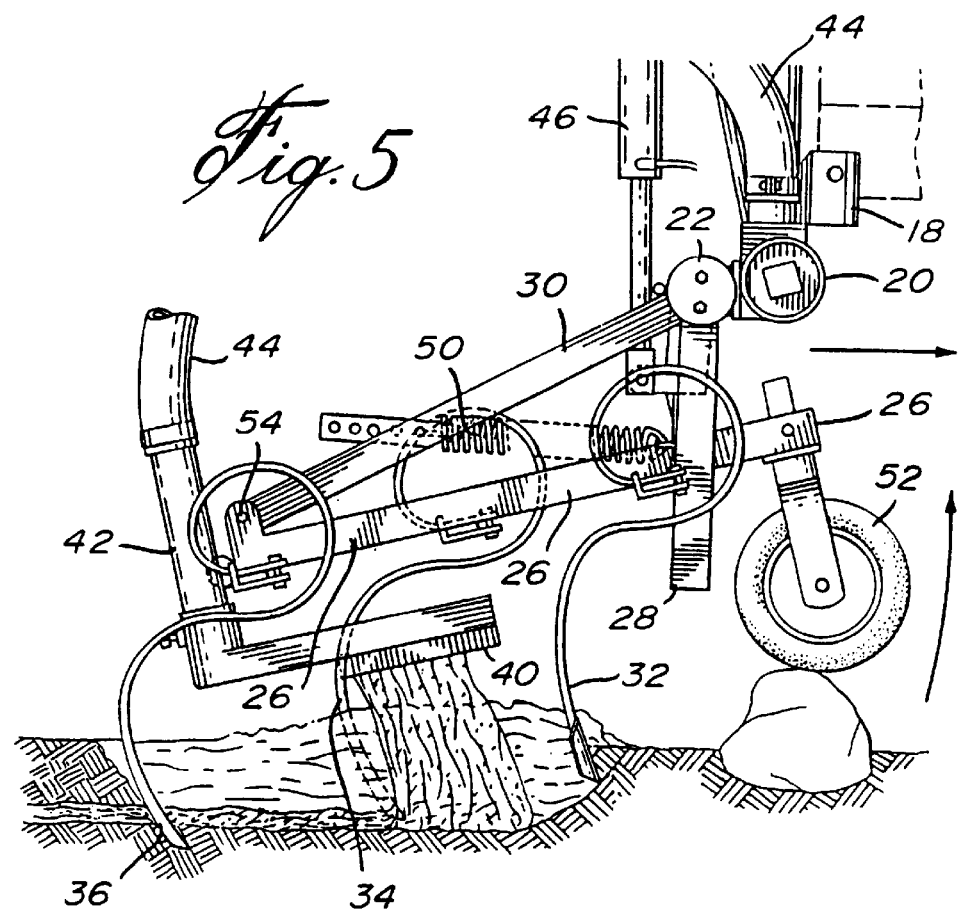
FIGS. 5 and 6 are fragmentary side elevations showing the apparatus in still different operative positions.
Figure 6:
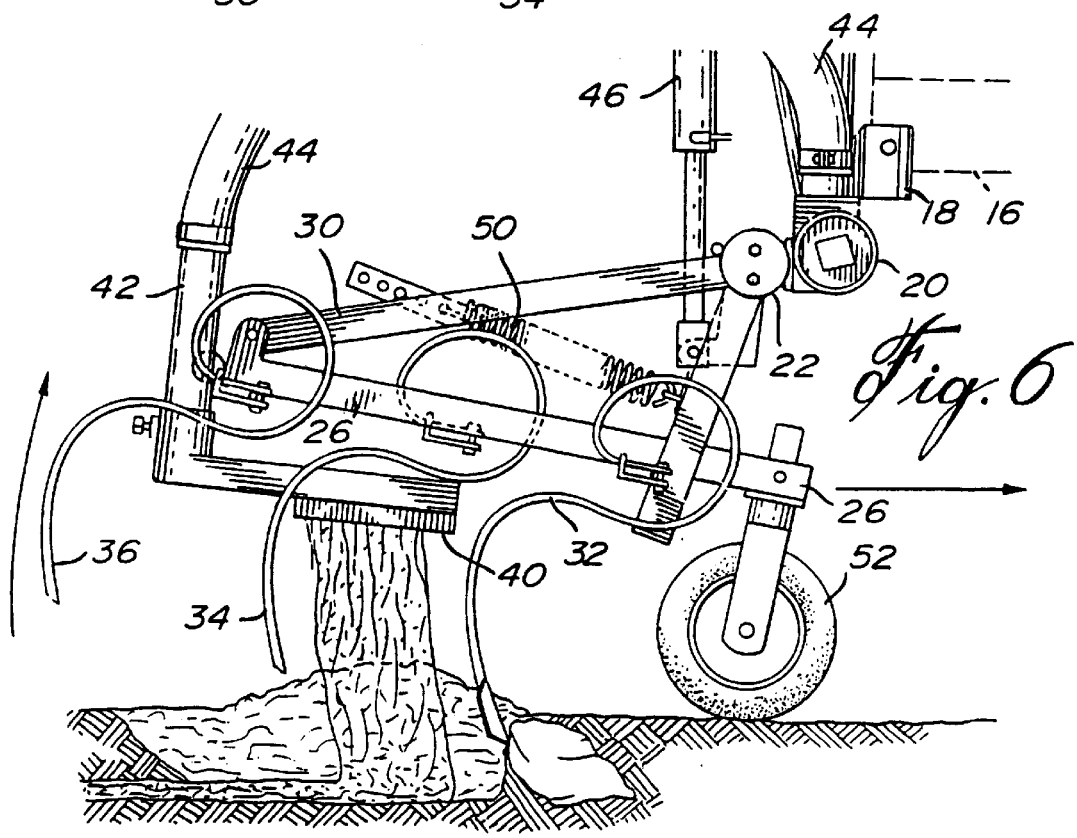

FIGS. 5 and 6 illustrate the action of the plow beam as it encounters certain obstacles such as boulders in the soil. As shown in FIG. 5, if the wheel 52 encounters a protrusion such as a boulder extending upwardly from the soil, it will ride over the boulder, thus pivoting the beam 26 counterclockwise about the pivot 54, raising the colter 32 and the plow teeth 34, 36 out of the soil. If the colter 32 should encounter a boulder as shown in FIG. 6, the distribution unit will rotate clockwise about the shaft 22, on the sleeve 22a, against the spring 50.

Figure 3B:
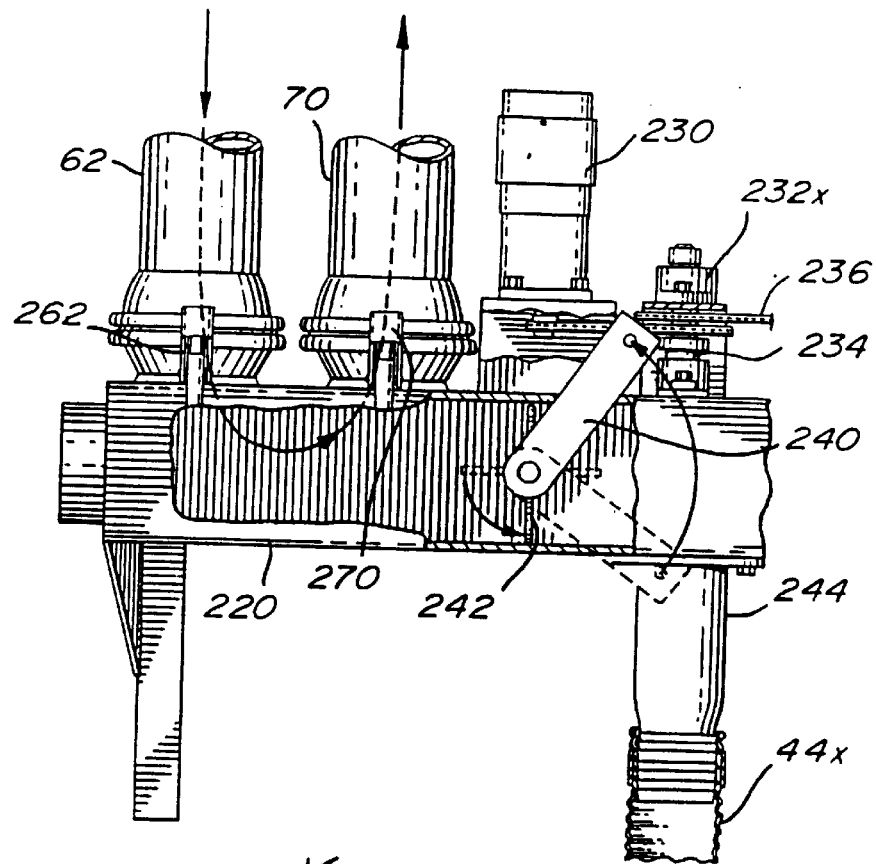
FIG. 3b is an enlarged fragmentary front elevation of the embodiment shown in FIG. 3a with a detail in a different operative position.

Referring now to FIGS. 3a and 3b, there is shown an alternative manifold for the distribution of the slurry to the various distribution units 14a to 14d. A manifold 220 is mounted on sub-frame 219. The manifold 220 communicates with the conduit 62 for receiving the slurry. Mounted in series on the manifold are a plurality of short pipes 244 which are adapted to receive the flexible tubes 44. On the top surface of the manifold 220, aligned with the pipe sections 244, are brackets 232a, 232b, 232c, 232d, 232x, and 232y. Each one of the brackets 232 mounts a sprocket assembly 234 which is adapted to drive a screw 238 which extends into the pipe 244, as shown in FIG. 3a. Chains 236 extend between each bracket 232x, 232d, 232c, 232b, 232a, and 232y in series in order to drive the sprocket assemblies 234 and thus the respective screws 238. A hydraulic motor 230 is mounted on the manifold to drive the series of chains 236.

In operation, as the slurry passes through the conduit 62 into the manifold 220, it will fill the manifold. Solid chunks of manure pass with the slurry and could block the pipes 244. The screws 238 force the break-up of such solids and keep the pipe sections 244 clear for the passage of the slurry. Thus, the slurry can move freely to the various distribution assemblies 14a through 14d, 14x and 14y.

In FIG. 3a, pipes 244x and 244y show that additional slurry distribution units 14x and 14y may be provided (not shown).

A lever 240 is illustrated in FIG. 3a connected to gate valve 242 within the manifold 220. As shown in FIG. 3b, when the gate valve 242 is closed, the slurry will be forced to pass through return conduit 70. The lever 240 may be actuated by means of connecting rod 248 which will be described later.

Figure 8:
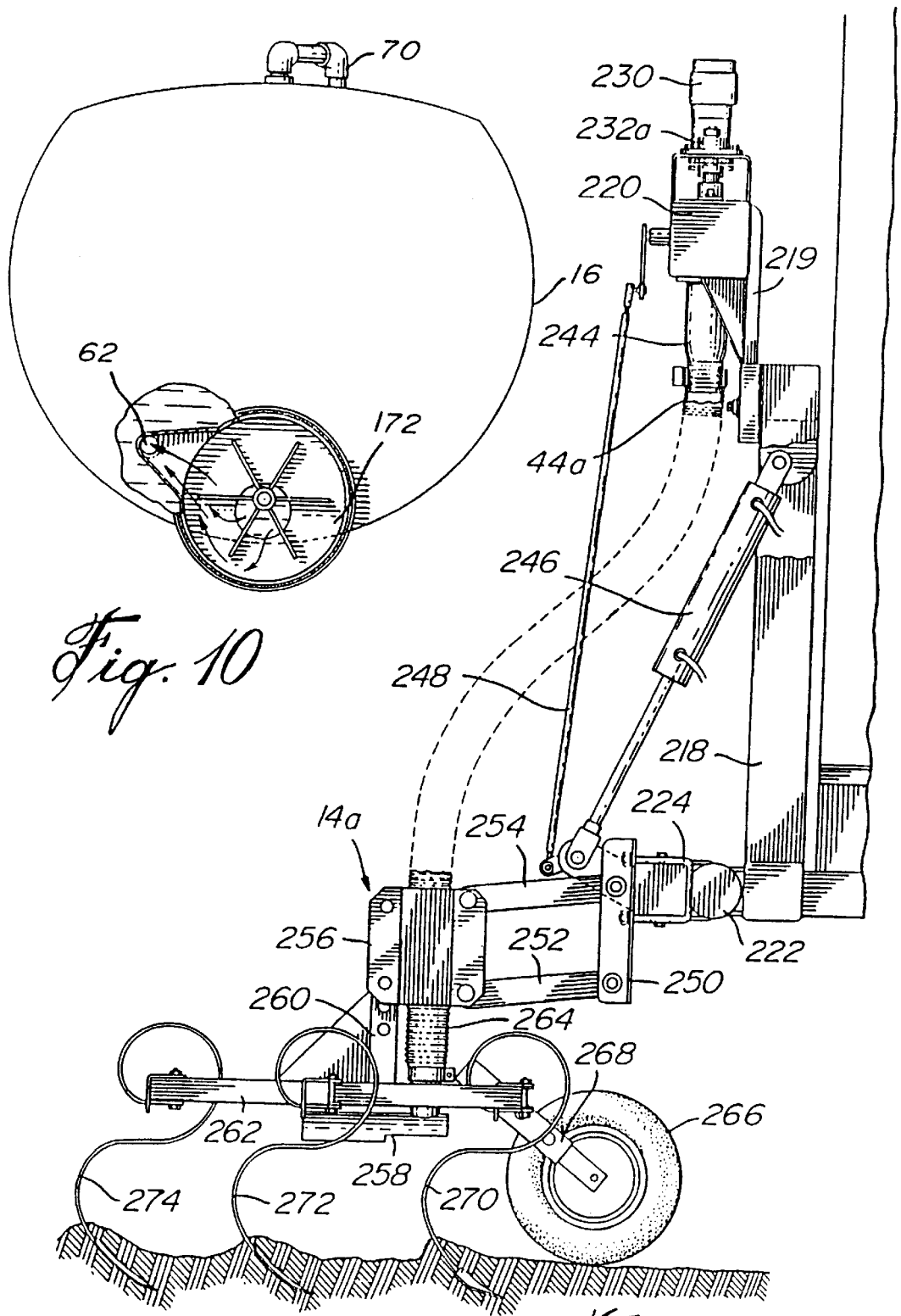
FIG. 8 is a side elevation similar to FIG. 2 but showing a different embodiment thereof.
Figure 9:
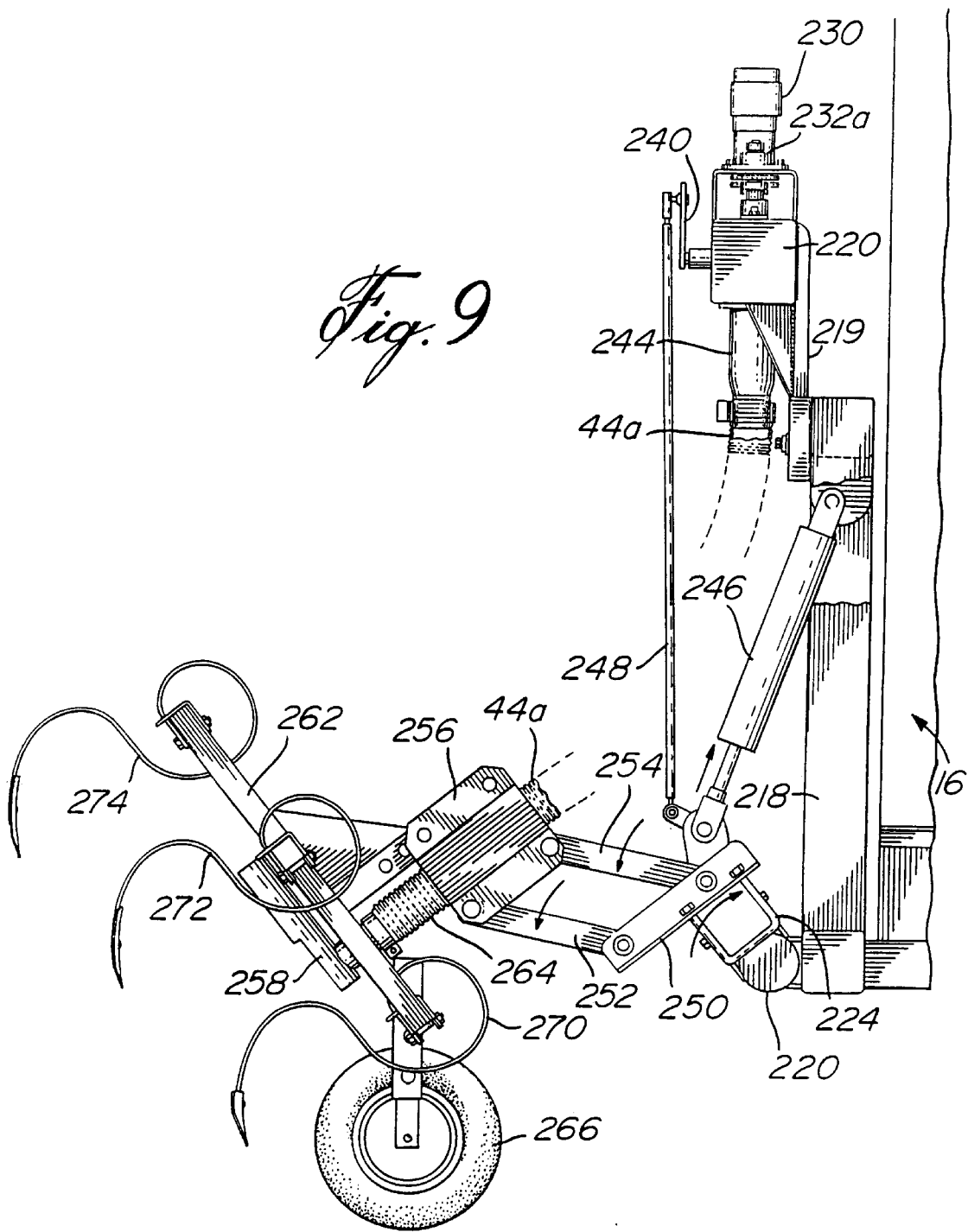
FIG. 9 is a side elevation similar to FIG. 8 showing the apparatus in a different operative position.

FIGS. 8 and 9 show another embodiment of the slurry distribution unit 14a. As can be seen in FIGS. 8 and 9, sub-frame 219, which mounts the manifold 220, is, in turn, mounted to frame 218. Distribution unit 14a includes bracket 224 fixedly mounted to shaft 222. A mounting bracket 250 is bolted to bracket 224, and a pair of parallelogram links 252 and 254 are pivoted to mounting bracket 250. Links 252 and 254 are pivotally connected at their other ends to sub-frame 256 which completes the parallelogram. A support member 260 is adjustably mounted to sub-frame 256. The plow beam 262 is fixed to the support member 260.

Colter 270 and plow teeth 272 and 274 are mounted to the plow beam 262, similarly to that described in FIG. 2. Shoe-shaped nozzle 258 is mounted to the plow beam 262 and communicates with flexible tube 44a. Idler wheel 266 is mounted on bracket 268.

FIG. 9 shows the distribution unit 14a in a retracted travel position. The cylinder and piston 246 can be operated to retract the distribution unit 14a, and the connecting rod 248 will rotate the lever 240 to close the gate valve 242.

The parallelogram linkage, represented by links 252, 254, will operate to allow the plow beam 262 to reciprocate vertically when the idler wheel or colter 270 engages an obstacle in its path. The plow beam, rather than pivot as shown in FIGS. 5 and 6, will reciprocate vertically parallel to the ground.

FIGS. 10 through 13 show the flow of manure slurry from the tank 16 to the manifold 20 or 220. An impeller pump 172 is provided at the front end of the tank 16 and is driven by an articulated shaft 73 driven by the tractor pulling the trailer. The slurry will pass through the conduit 62 and into the manifold 20 or 220. A return pipe 70 extends vertically from the manifold 20 to the top part of the tank 16.

Figure 11:
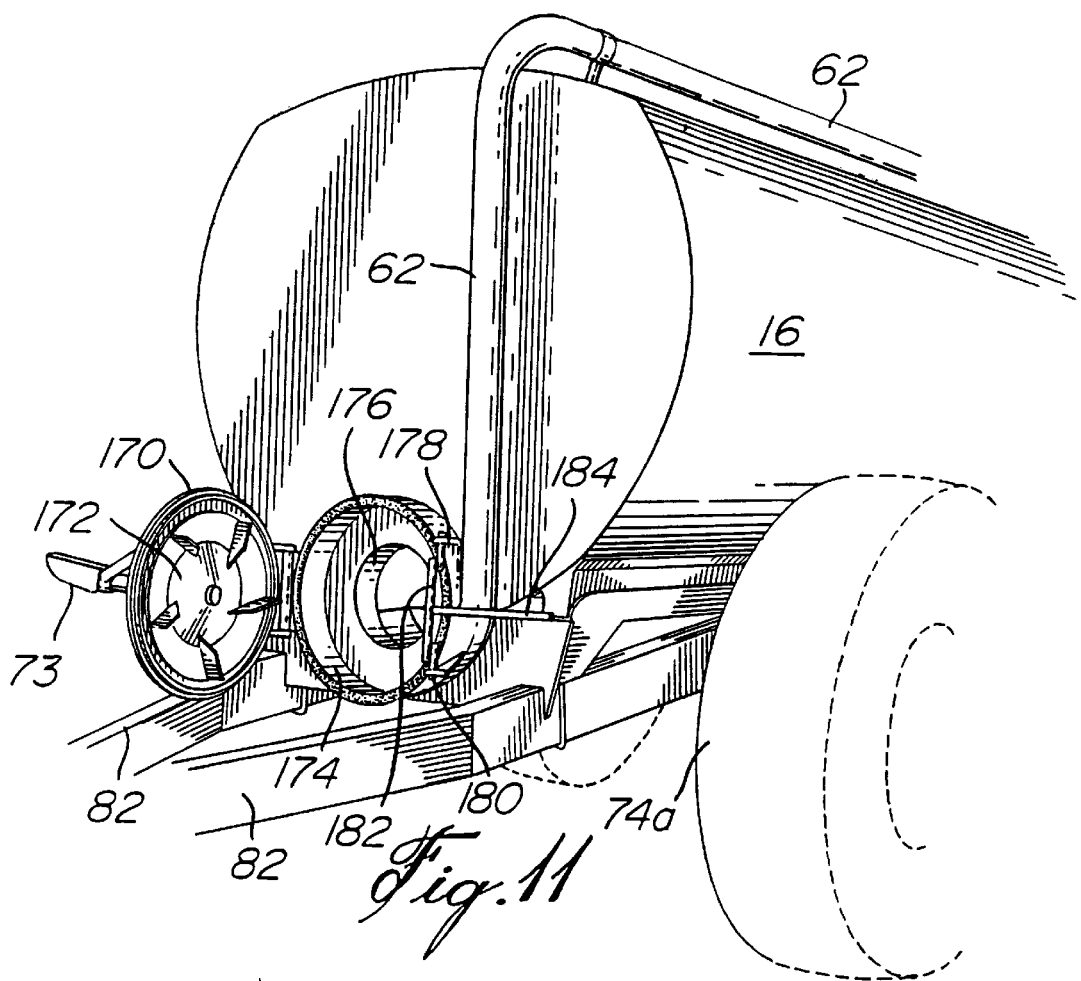
FIG. 11 is a fragmentary perspective view of the front end of another embodiment of the trailer, showing a detail similar to that in FIG. 10.
Figure 12:
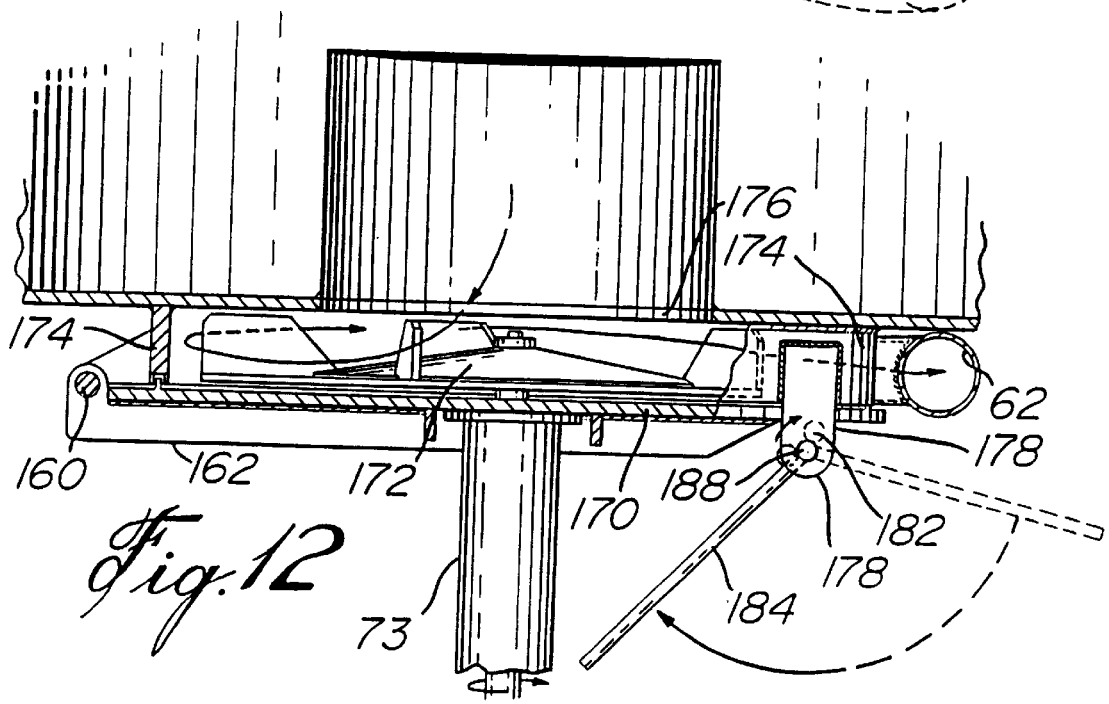
FIG. 12 is an enlarged fragmentary horizontal cross-section, taken through the detail shown in FIG. 11.
Figure 13:
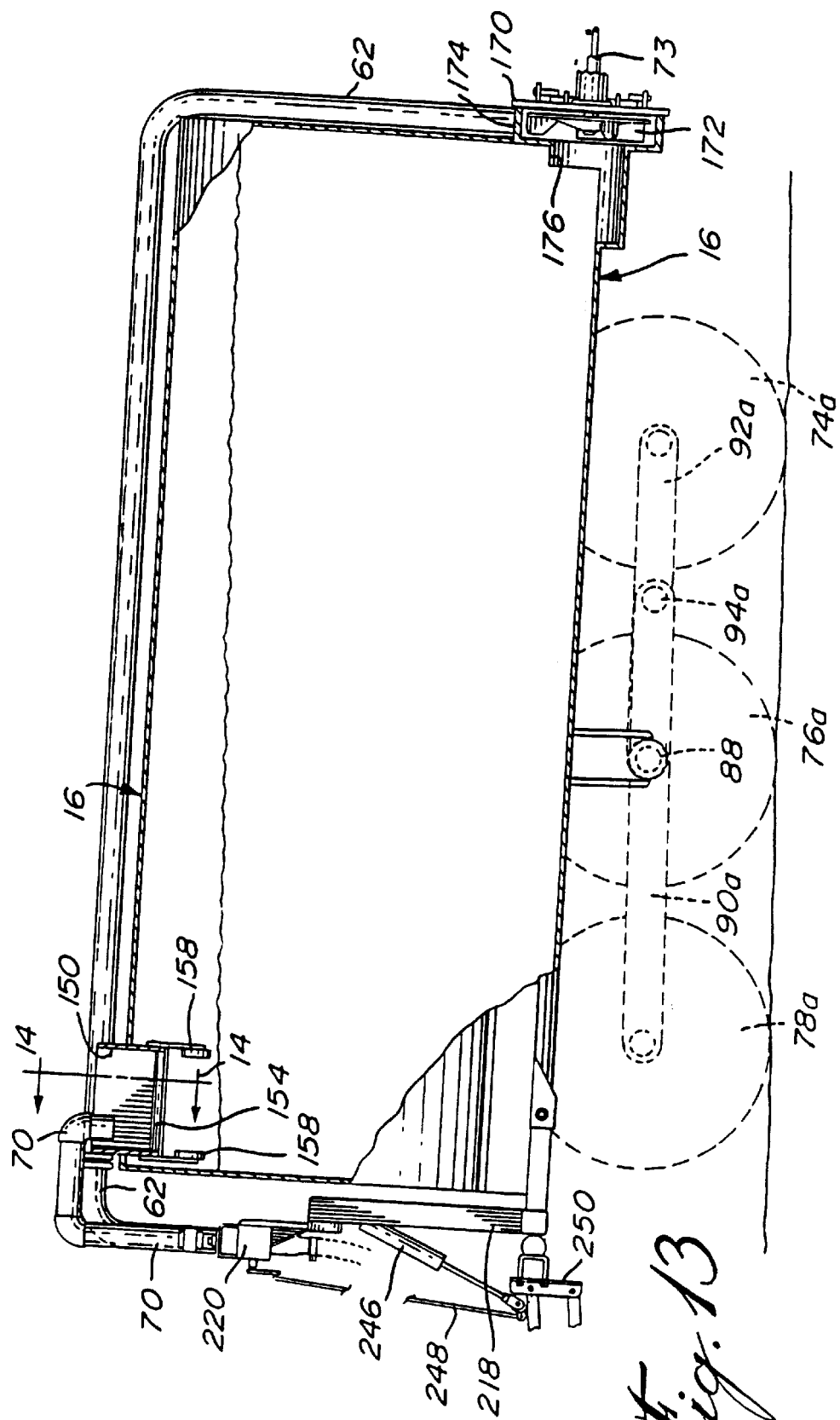
FIG. 13 is a vertical longitudinal cross-sectional view of an embodiment of the present invention.

FIG. 11 shows a further embodiment of the pump for moving the slurry from the tank 16 to the manifold 20 or 220. The tank 16 includes an opening 176 at the front end of the tank 16 which is closed by a door 170. Opening 176 is enclosed by an annular wall 174 onto which the door 170 closes. The door 170 mounts the impeller wheel 172 which is driven by the articulated shaft 73.

The door 170 is hinged on the annular wall 174 by means of hinge 160. A removable handle 184 includes pivot pins 188 adapted to engage brackets 178 and 180. An offset cam member 182 is provided as part of handle 184 to engage and lock door 170 against annular wall 174.

Figure 14:
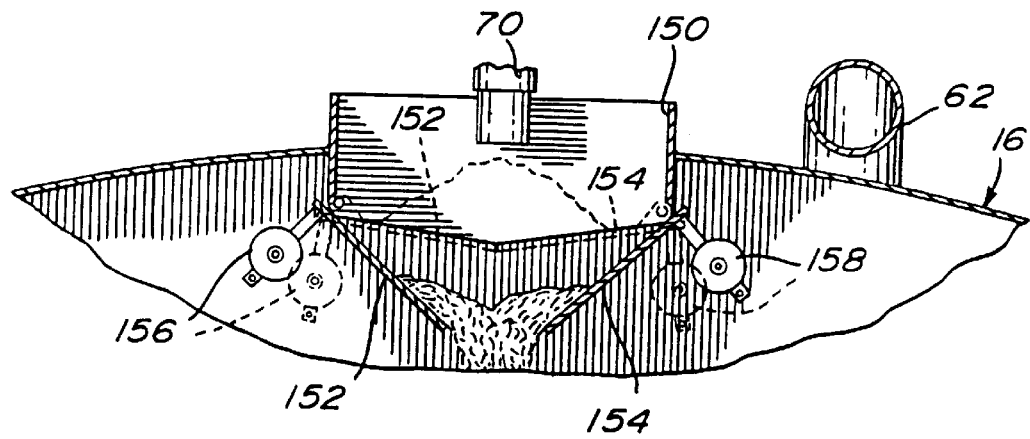
FIG. 14, which is on the same sheet as FIG. 3b, is an enlarged vertical cross-section, taken along line 14—14 of FIG. 13.

As mentioned previously, the return pipe 70 returns the slurry to the top of the tank 16 into a holding box 150 provided with a pair of hinged leaves 152 and 154 pivoted on opposite sides of the box 150 and adapted to form the bottom wall of the box. The leaves 152 and 154 are provided with counterweights 156 and 158 respectively. The leaves are normally in a closed position, as shown in dotted lines in FIG. 14, but when a predetermined mass of slurry is accumulated in the box 150, the leaves 152 and 154 will open, as shown in full lines in FIG. 14, allowing the slurry to return into the tank 16.

Referring now to FIGS. 15 through 20, and in particular to FIG. 16a, there is shown a suspension and steering system for a typical trailer 10 capable of being used with the distribution assembly 14. FIG. 16a illustrates a chassis 80 with a hitch pole 82, in this case, in the form of a V, with a hinged articulated extension 82a. A piston and cylinder arrangement 84 extends between a bracket 85 on the extension 82a and a component of the hitch pole 82.

In the present embodiment, there are three sets of wheels 74a and b, 76a and b, and 78a and b. The suspension arrangement of these wheels will now be described. An axle 88 is mounted to the chassis 80, and a wheel mounting beam 90a and 90b is pivoted at each end thereof. The wheel assemblies 78a and 78b are mounted at the rear ends of beams 90a and 90b respectively. Pivot shafts 94a and 94b are provided at the front free ends of beams 90a and 90b and mount the wheel mounting beams 92a and 92b respectively. Wheel mounting beams 92a and 92b mount wheels 76a and 76b at the rear ends thereof while wheels 74a and 74b are mounted to the front free ends of beams 92a and 92b.

Thus, when viewed from the side, as shown in FIGS. 15a through 15c, the wheels will operate in tandem as they pass over obstacles with little effect on the level-travel of the tank 16 on the trailer, thus reducing the possibility of the distribution assemblies 14 moving out of contact with the soil. As seen in FIGS. 15a through 15c, when the wheel 74a encounters an obstacle, it will rotate pivoting beam 92a counter-clockwise about the axis of the pivot shaft 94a with only a slight vertical movement transmitted to the axle 88 through the beam 90a.

Likewise, when the wheel 76a encounters the same obstacle, as shown in FIG. 15b, the beam 92a will rotate clockwise about the pivot shaft 94a, barely inducing vertical movement to the axle 88. Finally, when the wheel 78a moves over the obstacle, as shown in FIG. 15c, the wheel 78a will cause beam 90a to rotate about the axle 88 without providing much vertical movement to the axle 88 on which the tank 16 and the chassis 80 are supported. Since the beams 92a and 90a are independent of the beams 92b and 90b, the tandem wheels will operate independently on either side of the trailer.

Also incorporated in the suspension is a trailing wheel articulation system which is responsive to the direction of movement of the tractor vehicle pulling the trailer.

Referring now to FIGS. 16a, 17, 18, 19 and 20, the articulation of wheels 78a and 78b is provided as being at the ends of the beams 90a and 90b. A chassis beam 104 extends between the ends of beams 90a and 90b and mounts bearing brackets 103a and 103b which subtend hinge pins 100a and 100b to which bearings 99a and 99b are journaled. The wheel axles 102a and 102b are fixed to bearings 99a and 99b. A link 106 extends between brackets 108a and 108b which extend rearwardly from bearings 99a and 99b so as to complete a parallelogram. Link 106 is connected to the brackets 108a and 108b by universal joints.

Figure 20:
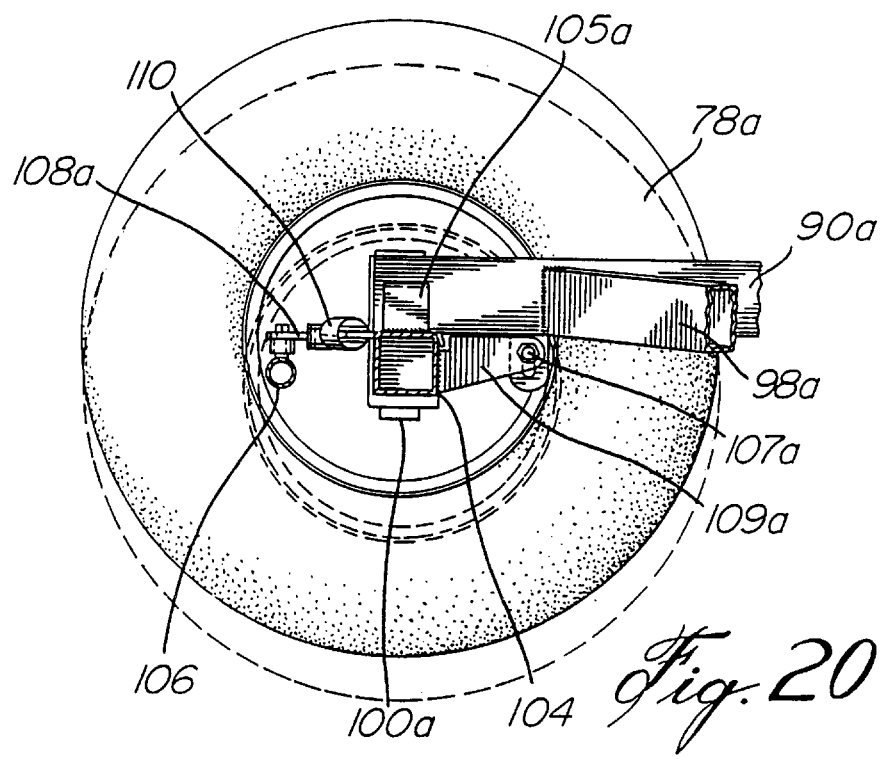
FIG. 20 is a vertical cross-section, taken along line 20—20 of FIG. 19.

The ends of the beams 90a and 90b are connected to the chassis member 104 by means of hinge brackets 109a pivoted at pivot pin 107a in a lost-motion slot. This is best seen in FIG. 20. Guide members 105a and 105b enable the ends of the beams 90a and 90b to sit properly in the prescribed location on the chassis members 104. The hinging brackets 109a and 109b allow some independent movement of the wheels 78a and 78b relative to each other.

A piston and cylinder arrangement 110 is provided with one end mounted to a bracket 108a and the other end thereof connected to a bracket on chassis member 104. There is hydraulic communication between opposite cylinder chambers in the piston and cylinder arrangement 84 and piston and cylinder arrangement 110. Thus, as seen in FIG. 16a, when the hitch pole extension 82a is rotated to the left in the pulling direction, thus retracting the piston in the cylinder 84, the piston and cylinder arrangement 110 will be extended, thus moving the brackets 108a and 108b in a clockwise movement (FIG. 16a) so that the rear wheels 78a and 78b follow an arc similar to the arc traced by the tractor (not shown). If the tractor steers towards the right of the direction of movement, the opposite reaction will occur. Thus, the articulating wheels 78a and 78b will steer in a counterclockwise direction tracing the arc traced by the tractor.

Figure 16B:
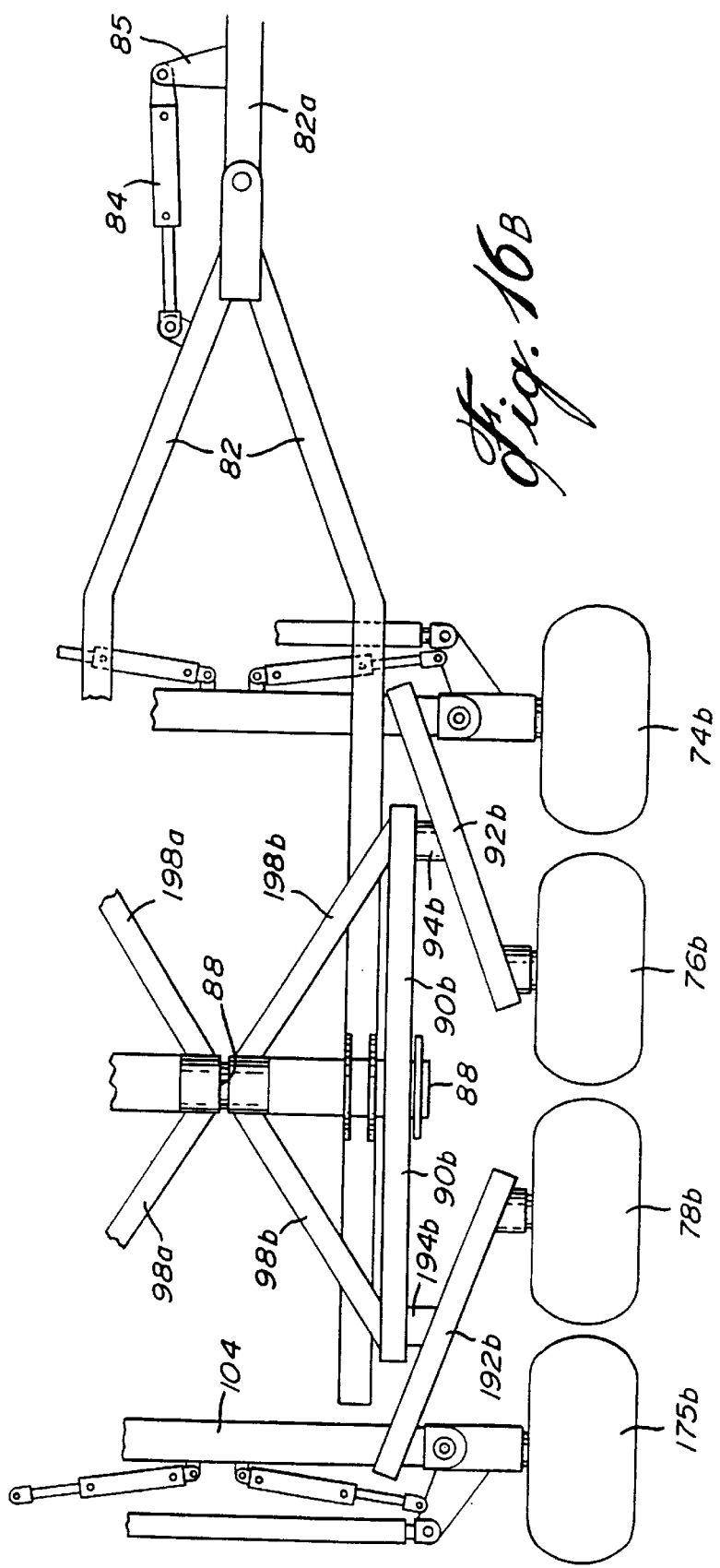
FIGS. 16a, which is on the same sheet as FIG. 7, and 16b are schematic plan views of different embodiments of a detail of a further aspect of the present invention.
Figure 17:
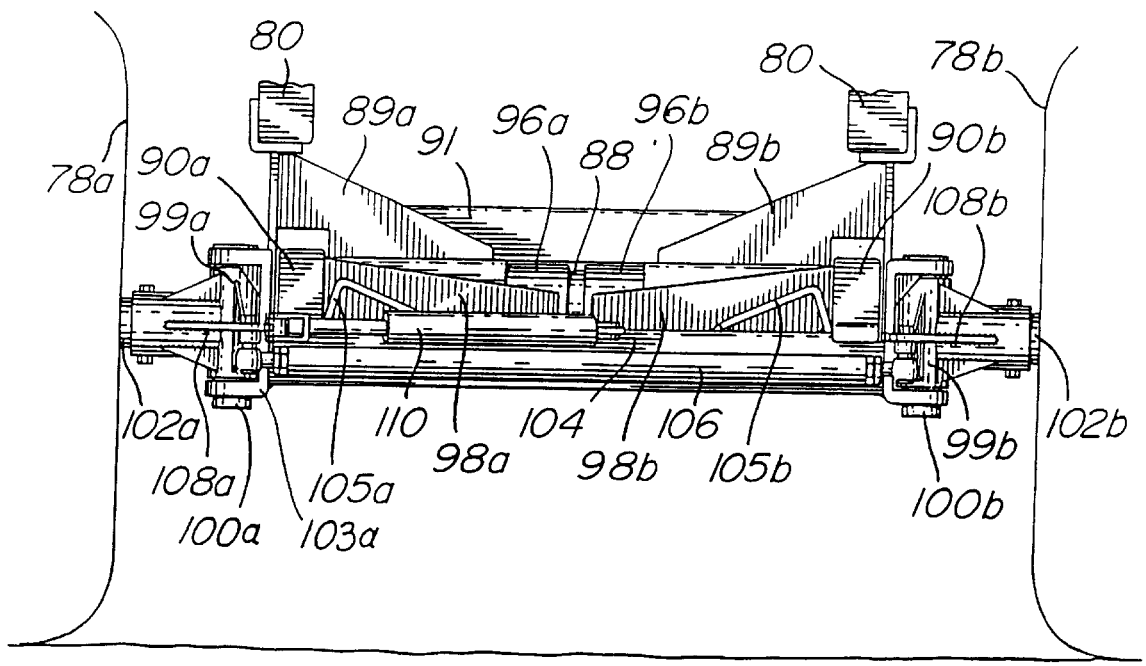
FIG. 17 is an enlarged fragmentary rear view of a detail of the present invention.
Figure 19:
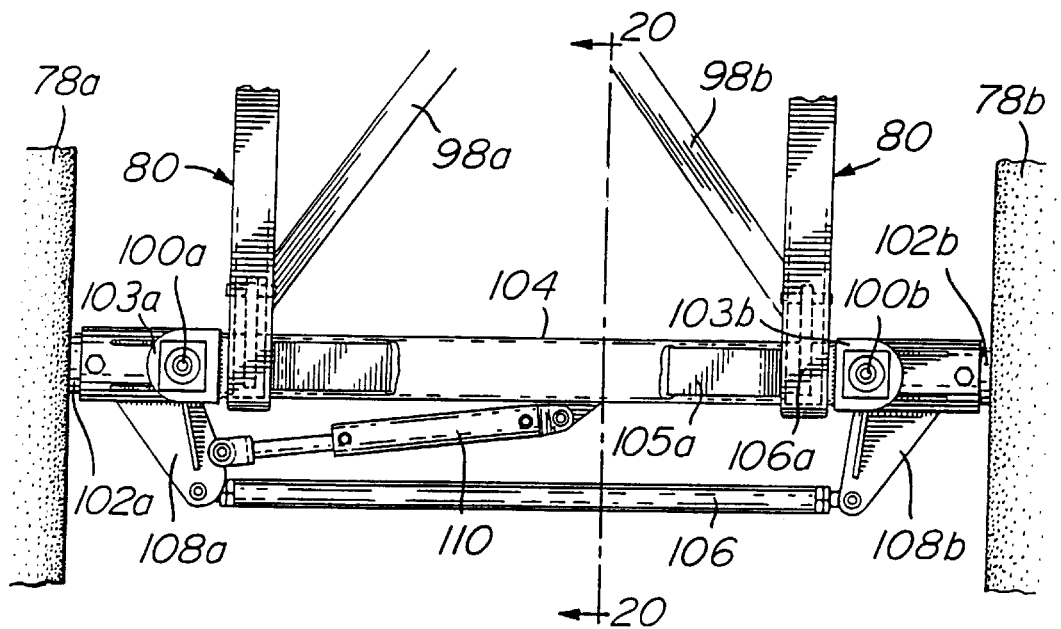
FIG. 19, which is on the same sheet as FIG. 17, is a top plan view of the detail shown in FIG. 17.

It has also been contemplated to provide four sets of wheels on the trailer 10 with the front wheels 74a and b and the rear set set of wheels 175a and b being articulated. FIG. 16b shows how such an arrangement could be devised. Wheels 175a and b would be mounted in a manner similar to that just described with respect to wheels 78a and 78b in the embodiment shown in FIGS. 16a and 17 through 20. The front wheels 74a and 74b would likewise be articulated for steering purposes in a manner similar to that described in FIGS. 17 through 20.

In a four-wheel suspension system as shown in FIG. 16b, the beam 90b mounts pivot shafts 94b and 194b at the other end thereof, and beams 192b are pivotally mounted to shaft 194b. Wheel 78b is mounted at the front end of beam 192b while articulated wheel 175b is mounted to the rear end of beam 192b in the same manner as the articulated wheels 78b were mounted to the ends of beams 90a and 90b in FIGS. 17 through 20, for instance.

Figure 18:
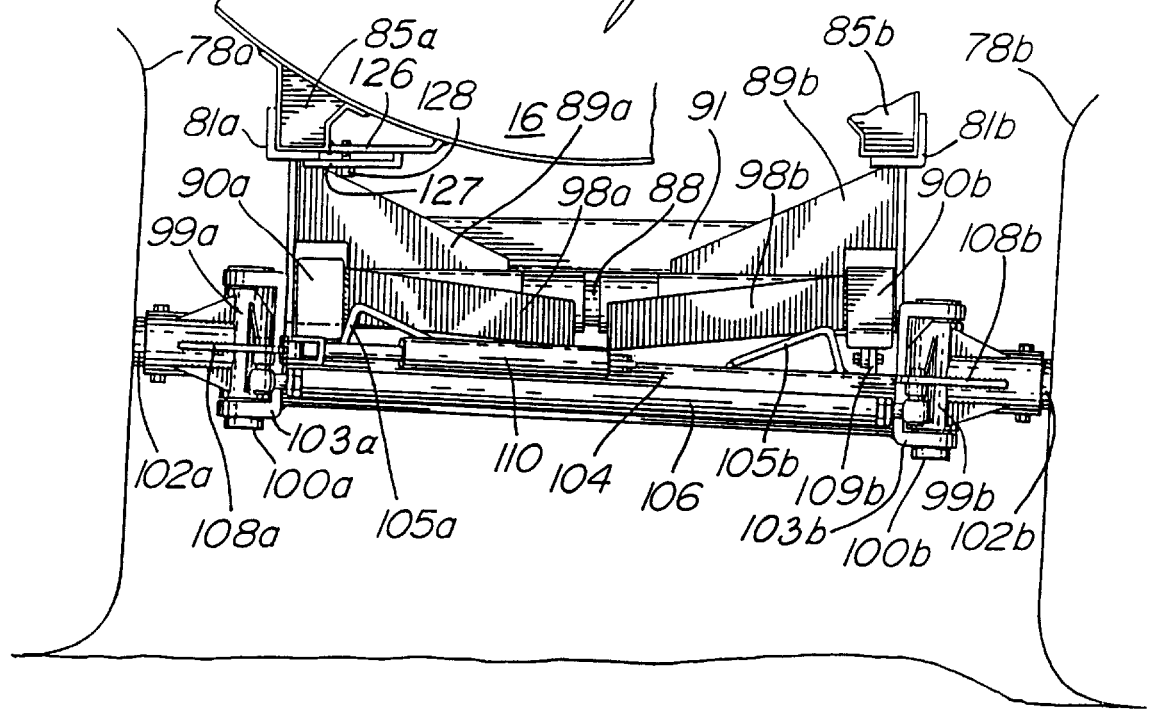
FIG. 18 is an enlarged fragmentary rear view of the detail shown in FIG. 17 but in a different operative position.

The tank 16 may be mounted in a manner to provide quick replacement of the tank, and this could be provided by having elongated right-angle rail seats 81a and 81b, as shown in FIG. 18, for receiving support members 85a and 85b welded to the tank body. Clamps 126 having adjustment bolts 128 can be provided at different locations. The clamps 126 are welded to the base of the tank 16, and a tongue 127 extends to engage the bottom of the angle rail 181a. Once the tank is mounted on the chassis, the adjustment bolt 128 may be tightened to tighten the tongue 127 clamping the bracket 126 to the rail 181a.

I claim:

1. In an apparatus for spreading fertilizer slurry, including a vehicle and a holding tank mounted on the vehicle, wherein the holding tank includes at least a front wall and an opening located on the front wall near the bottom of the holding tank, and an annular wall defining an impeller pump area surrounds the opening and a door is hinged to the annular wall and closes on the annular wall surrounding the opening, an impeller pump wheel mounted on the door in the pump area facing the opening and an outlet pipe communicating through the annular wall with the impeller pump area such that slurry in the holding tank can be pumped through the outlet pipe by rotating the impeller pump wheel in the door.

2. In an apparatus for spreading fertilizer as defined in claim 1, wherein the door is hinged to the annular wall and a handle including a cam member is pivotally mounted to the annular wall diametrically opposite the hinge portion of the door, and the cam member of the handle is adapted to engage the door when it is closed in order to firmly close the door against the annular wall and thereby seal the tank and the impeller pump area.

* * * * *